Nov. 12, 1957 P. WARGO 2,813,264
SPEED RESPONSIVE CONTROL DEVICE
Filed Dec. 8, 1955 3 Sheets-Sheet 1
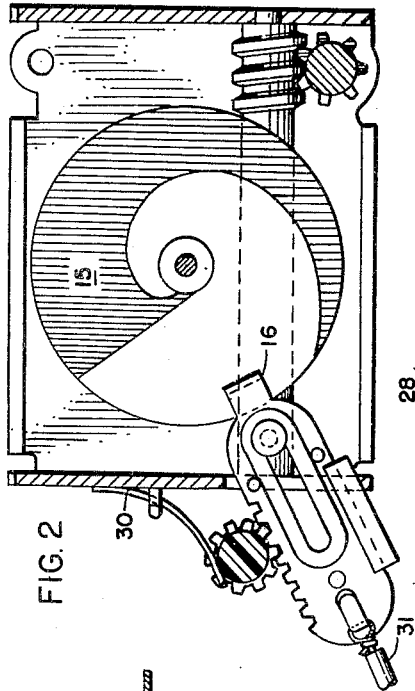
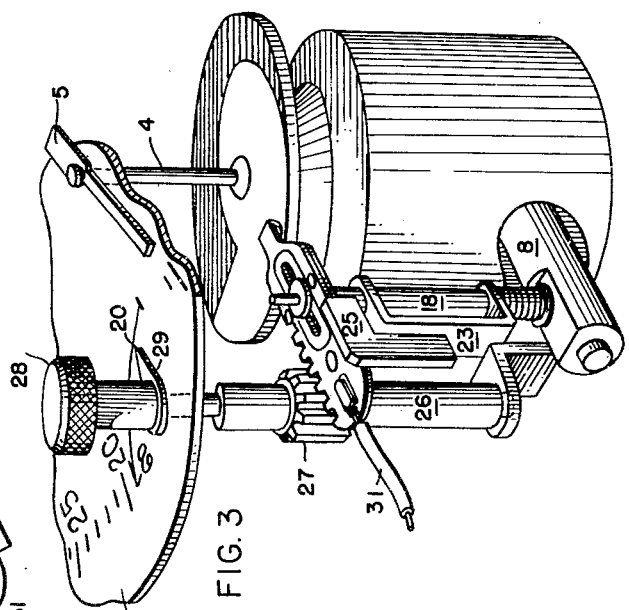
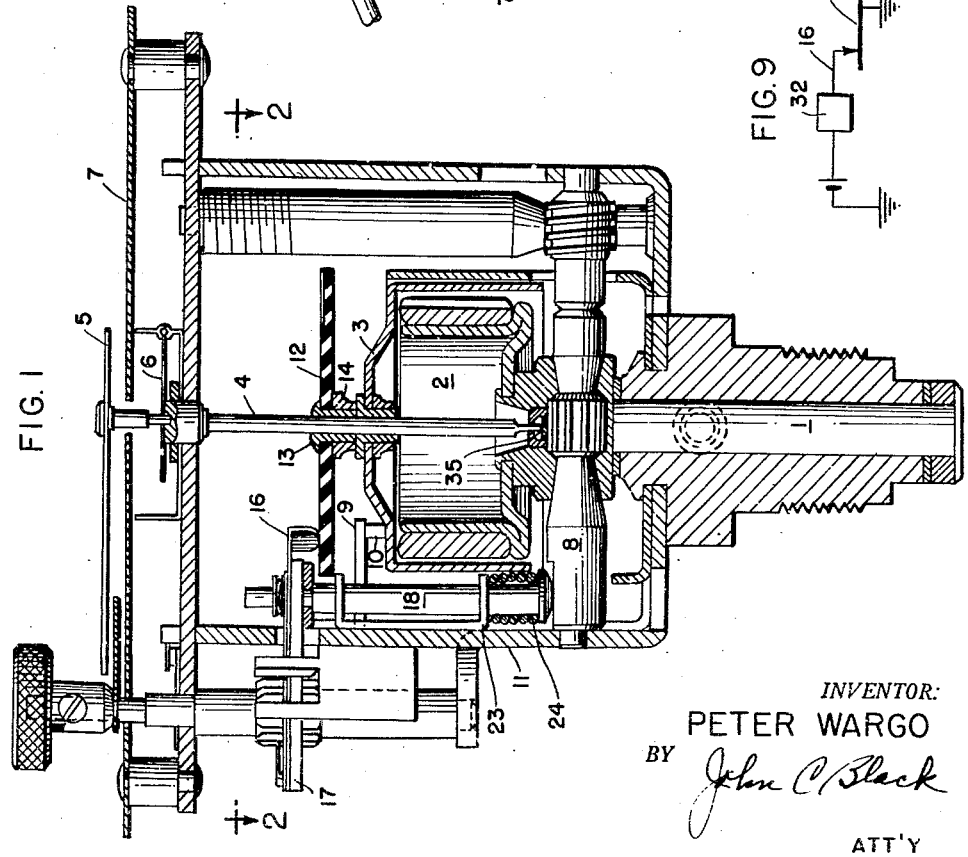
INVENTOR:
PETER WARGO
BY John C. Black
ATT'Y Nov. 12, 1957 P. WARGO 2,813,264
SPEED RESPONSIVE CONTROL DEVICE
Filed Dec. 8, 1955 3 Sheets-Sheet 2

INVENTOR:
PETER WARGO
BY John C. Black
ATT'Y

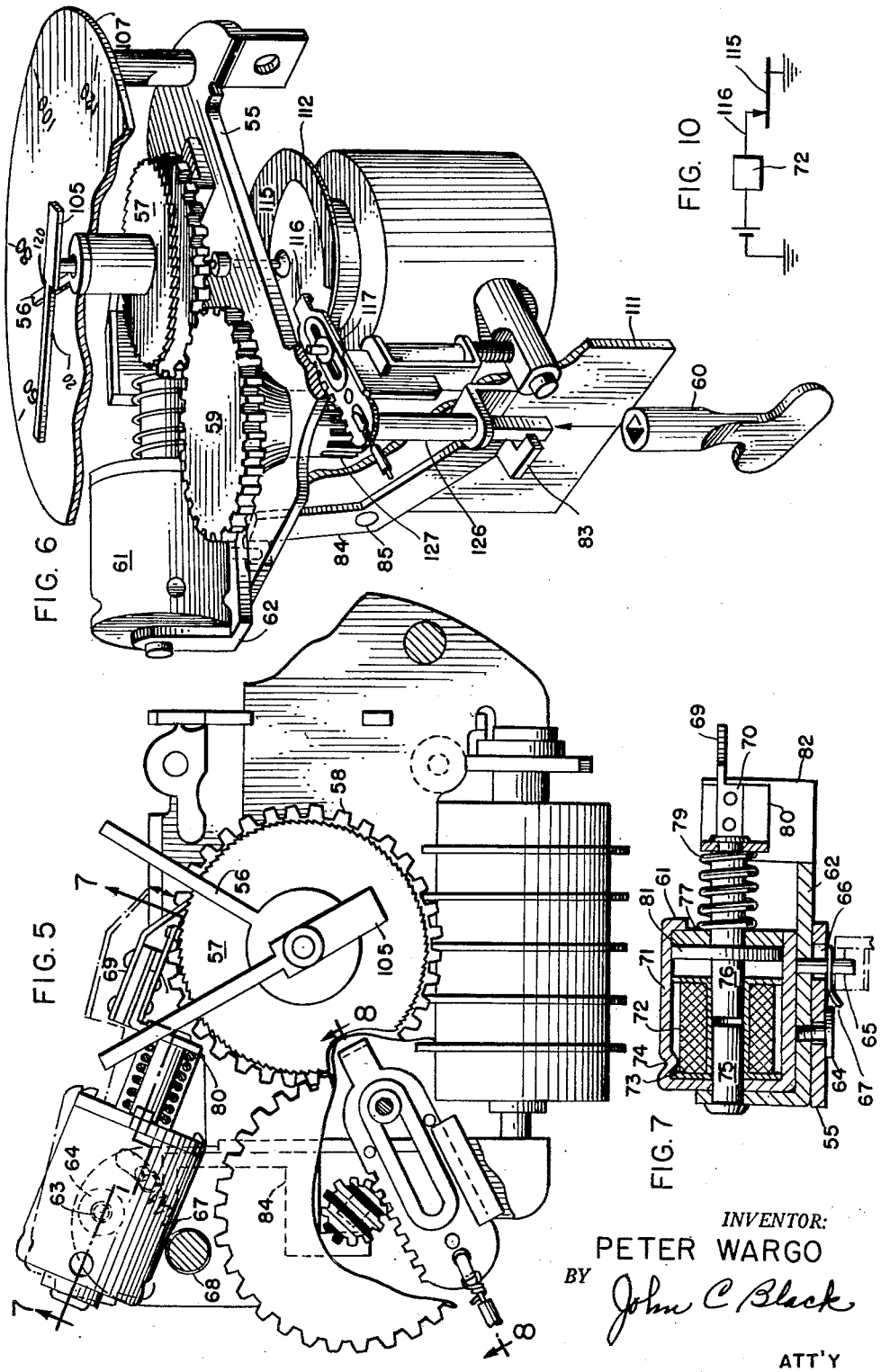

United States Patent Office 2,813,264
Patented Nov. 12, 1957

2,813,264

SPEED RESPONSIVE CONTROL DEVICE

Peter Wargo, Maywood, Ill., assignor to Stewart-Warner Corporation, Chicago, Ill., a corporation of Virginia Application December 8, 1955, Serial No. 551,857

20 Claims. (Cl. 340—264)

This invention relates in general to speed responsive devices and, more particularly, to control means associated therewith.

The invention herein has been especially designed for the purpose of providing positive, reliable control functions by speed responsive devices independent of the amount of power available in said devices.

At an early stage in the development of the art, it became clear that the magnetic type speedometer was an economical yet very accurate type instrument. The magnetic type speedometer is most commonly actuated (1) mechanically by direct connection to the vehicle transmission or (2) electrically by a motor which is controlled by a generator operatively connected to the transmission. In both instances a permanent magnet is rotated on a shaft (driven mechanically or electrically) within a rotatably mounted metallic cup-shaped member which is angularly displaced in proportion to the speed of rotation of the magnet in a well known manner. Also, in this type speedometer, it is common to control an odometer by means of a gear train interconnected with the magnet shaft.

In order to reduce cost and size, magnetic type speedometers have been designed with unusually low power requirements for moving a pointer across a calibrated dial. This has been true, regardless of the type of actuation used for the speedometer whether mechanical or electrical. Closely related to the problems of cost and size is a further problem of maintaining a reasonably moderate speed of rotation of the magnet in order to avoid excessive wear on bearing parts to avoid the necessity of larger and/or more expensive bearing and support components. This requirement of a moderate speed of rotation also results in less power available for moving the pointer.

As a result of the heavy emphasis upon cost, size and speed considerations, the commercial magnetic speedometer of today has emerged as a device having substantially no more power than is necessary to move the pointer against a force of a small restoring hair spring. Those well acquainted with the field have come to recognize the fact that speed warning and speed governing devices have not been properly controlled by said modern commercial magnetic speedometer due to its inherent low power. For example, conventional centrifugally operated speed responsive devices have more than enough power to operate contacts, vary resistances and to perform other control functions; whereas this has not been feasible up to the present time with the use of the commercial magnetic speedometer.

This situation becomes readily apparent when one studies the innumerable commercial applications in which it has been necessary to resort to a second speed responsive device to perform control functions when a vehicle has a conventional magnetic speedometer.

Accordingly, the primary object of the present invention is the provision of means whereby speed-responsive means can control other apparatus irrespective of the power available in said speed-responsive means.

It is a primary object of this invention to provide a magnetic speedometer arrangement capable of performing reliable control functions.

It is another object of this invention to provide an excessive speed warning device controlled by the commercial, low-power magnetic speedometer in use today.

It is another object of the present invention to provide a maximum speed indication arrangement controlled by the commercial, low-power magnetic speedometer in use today.

A primary feature of this invention is the provision of control means which affects the low-power of the magnetic speedometer only intermittently, whereby the speedometer is not adversely affected.

Another primary feature of the present invention is the provision of a unique maximum speed indicating arrangement.

Another primary feature is the provision of control means within the space requirements of present commercial speedometers with little change in structure.

Other objects and features will become evident upon a perusal of the following description in which:

Fig. 1 shows an elevation view, partially in section, of the excessive speed warning arrangement;

Fig. 2 is a view along line 2—2 of Fig. 1 showing the electrical contact means;

Fig. 3 shows a fragmentary perspective view of the new elements for the speed warning arrangement;

Fig. 5 is a view substantially along the line 5—5 of Fig. 4;

Fig. 6 shows, in perspective, and partially in section, the new elements of the maximum speed indication arrangement;

Fig. 7 shows an elevation view, partially in section, of a magnet utilized in the maximum speed indication arrangement;

Figs. 9 and 10 show circuit diagrams for the speed warning and maximum speed indicating arrangements, respectively.

Figure 4:
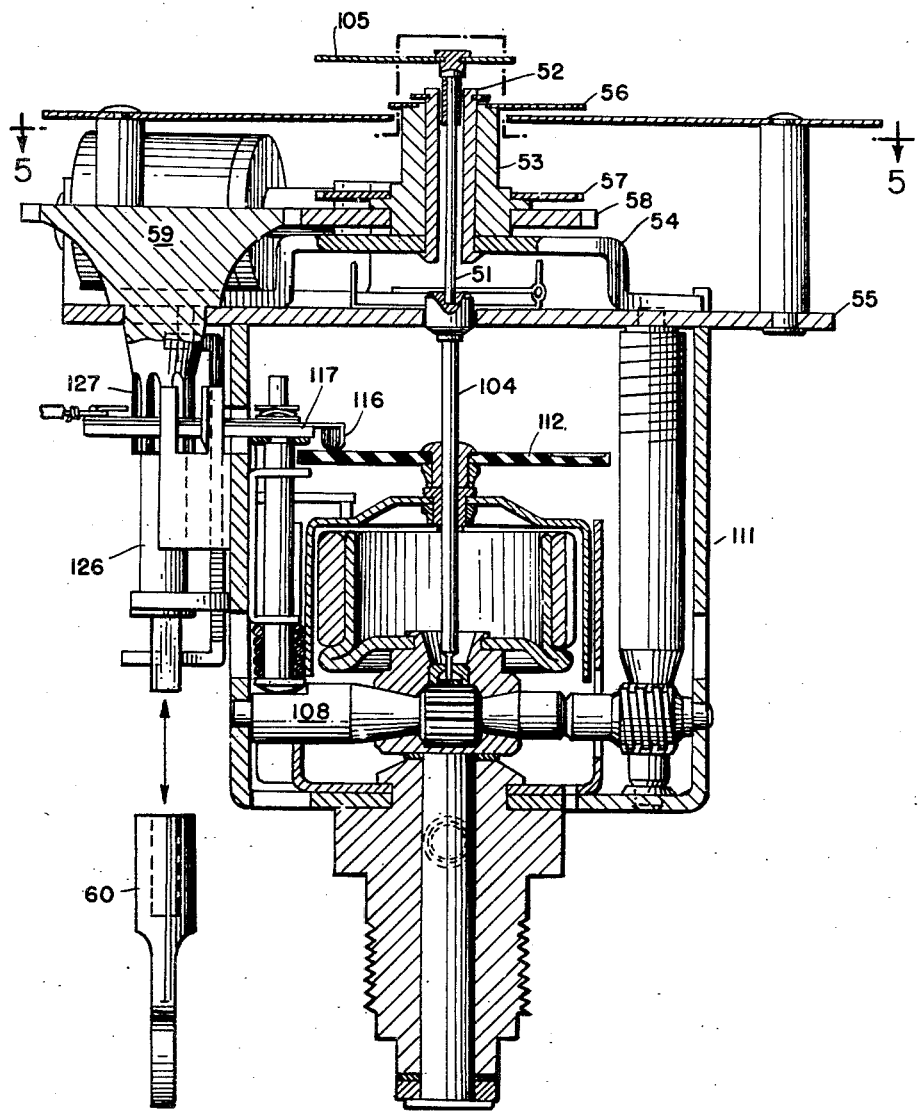
Fig. 4 shows an elevation view, in section, of the maximum speed indication arrangement.
Figure 8:
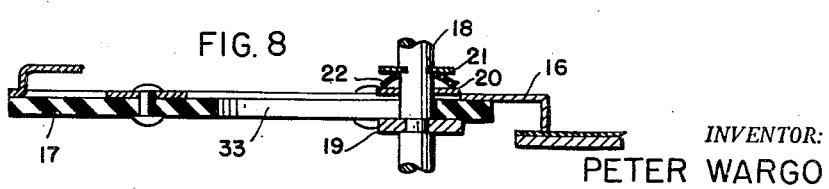
Fig. 8 shows a sectional view of an electrical contact and its mounting.

In general, the preferred embodiment of the speed warning arrangement operates as follows:

A non-metallic disk is rotated with the pointer of the speedometer. The top of said disk is coated, for example by printed circuit process, with a helical copper conducting surface, such that, as the disk is rotated to positions corresponding to higher speeds, the width of the copper surface will increase at some predetermined radial position. A contact is positioned in said radial position and is manually adjustable to be preset to make contact with said disk at a certain point along said radius. Said contact will therefore touch the copper conducting surface in a predetermined position of said disk and at any position of the disk corresponding to a higher speed. Without any further provision, even a light contact pressure between the contact and the disk would adversely affect the rotation of the disk due to the low power applied thereto. To avoid this condition, the applicant now makes provision for imparting reciprocable motion to the contact preferably in a plane perpendicular to the surface of said disk and preferably in a manner such that the contact will be in engagement with the disk for a shorter period of time than it is out of engagement with the disk. In this manner, there will be sufficient time during the interval when the contact and disk are not in engagement with each other for moving the disk and the pointer accurately to a position corresponding to the instantaneous speed of the vehicle. When a predetermined speed is attained by the vehicle, the intermittent engagement of the contact and the copper surface on the disk can be utilized to intermittently close a circuit for causing an alarm, such as a flashing light or a buzzer.

In general, the preferred embodiment of the maximum speed indicating arrangement utilizes the same intermittent contact arrangement to intermittently energize a solenoid which moves a ratchet wheel, to which wheel is connected a maximum speed indicator. However, in this arrangement the contact, intermittently engaging the disk, is initially set for making contact with the copper conducting surface on the disk at a position of the disk corresponding to a predetermined speed; and, as the magnet moves the maximum speed indicator to a position corresponding to the highest instantaneous speed, it also moves the contact by means of a gear train to a position corresponding to said highest speed, in which position said contact does not engage the copper conducting surface on the disk until said speed is exceeded.

It is to be noted in the various figures that no attempt has been made to show the precise relative positioning of the contact and copper conducting surfaces with respect to the positioning of the dial scales and pointers so that the various mechanical details could be more clearly shown. The relative positioning of parts in a working model is a calibrating operation apparent to all skilled in the art.

Attention is now directed, more particularly, to the excessive speed warning arrangement shown in Figs. 1–3 and 8. The speedometer per se is old in the art and will not be described in detail. Briefly, the speedometer comprises a shaft 1 carrying a permanent magnet assembly 2 at the upper end thereof, as shown in Fig. 1. A metallic cup-shaped member 3 pivoted on a shaft 4 is disposed about the magnet assembly 2. A pointer 5 is secured to the upper end of shaft 4 and rotates therewith. As the magnet assembly 2 is rotated by the shaft 1, the member 3 is angularly displaced against the force of restoring hair spring 6 in proportion to a speed at which the magnet assembly 2 is rotated, pointer 5 being rotated across the calibrated face plate 7 to indicate the speed. An odometer (not shown) is operated in a manner well known in the art by means of a gear train including cross gear 8. Projections 9 and 10 secured respectively to frame 11 and member 3 are stops for the purpose of positioning member 3 at zero miles per hour.

A disk 12 is secured to shaft 4 by means of metallic bearings 13 and 14 (Fig. 1). Applied to disk 12 (for example, by printed circuit technique) is an electrical conducting material 15 such as copper preferably having a helically shaped inner edge, as shown in Fig. 2, said material being in electrical connection with grounded metallic bearing 13. It will be noted that disk 12 must rotate a small amount before any portion of surface 15 can engage contact 16. This has been arbitrarily arranged to point up the most probable direction to be followed in commercial products—no warning is desirable under a predetermined speed, for example 20 M. P. H. This has the advantage of reducing the required longitudinal movement of contact 16.

A contact 16, secured to an insulated base 17, is carried by a reciprocable push rod 18, preferably made of an insulating material such as nylon. Said contact 16 and base 17 are secured to push rod 18 by means of a support washer 19 (Fig. 8) and washers 20 and 21, the latter two washers having tensioned therebetween an arcuately formed washer 22 which provides a resilient, yet firm, connection. The washers 20 and 22 have axial bores somewhat larger than the diameter of push rod 18 so that they may be forced into position from the top of push rod 18. Washers 19 and 21, however, have U-shaped portions cut away so that they may be pushed radially into annular grooves cut into push rod 18.

In order to maintain at a minimum the longitudinal movement of contact 16, it is contemplated that commercial models will have a maximum speed at which the warning device may be preset, for example 60 or 70 M. P. H., above which speed the warning will be given at all times. This is accomplished quite simply by adjusting the length of aperture 33 (Fig. 8) through which push rod 18 extends.

The push rod 18 is guided by a U-shaped bracket 23 rigidly mounted on frame 111 in any suitable manner, for example, welding. The horizontally disposed projections on bracket 23 have aligned apertures adapted to slideably receive the push rod 18. The push rod 18 rides on the top of cross gear 8 and is urged against cross gear 8 by spring 24. The left end of cross gear 8, with respect to Fig. 1, has a portion thereof cut away in order to impart reciprocating motion to push rod 18.

The pressure with which contact 16 engages disk 12 can be controlled by proper control of the radial depth of the cam surface on gear 8. Also, attention is directed to the preferred method of making contact with disk 12 in a plane parallel to shaft 4 so that the force is directed substantially axially along shaft 4 to the jewel bearing 35 to provide minimum frictional resistance to the rotation of shaft 4 and minimum wear.

A guide 25 (Fig. 3) is provided for the contact base 17. On the opposite side of contact base 17 is a nylon shaft 26 having a spur gear portion 27. In mesh with spur gear 27 is a rack portion of contact base 17. At the upper end of shaft 26 are a knob 28 and a pointer 29, said pointer 29 cooperating with a scale for presetting the warning device for a certain desired speed. As clearly shown in Fig. 3, moving the knob 28 in one direction or the other, causes the contact 16 to be moved toward or away from the shaft 4. A spring 30 (Fig. 2) urges the shaft 26 toward contact base 17. A conductor 31 is connected to contact 16 (Fig. 3).

Fig. 9 shows the circuit for intermittently operating an alarm device 32 by contact 16 and surface 15.

Attention is now directed, more particularly, to Figs. 4–7, which show the various details and features of the maximum speed indication arrangement. Components in Figs. 4–7, corresponding to components in Figs. 1–3, have reference numerals numerically greater by 100; for example, frames 111 and 11. The details of the speedometer per se, the disk and the reciprocable contact are substantially the same as shown in Figs. 1–3 and will be described only insofar as it is necessary to adequately describe the other details and features specific to Figs. 4–7.

With respect to Fig. 4 it will be noted that the speedometer pointer 105 is secured to an elongated shaft 51, which in turn rotates with shaft 104. Said shaft 51 is rotatable within bushing 52, which bushing is secured to bracket 54, which in turn is suitably secured to the jewel bracket 55 mounted on the frame 111. A second bushing 53 is rotatably mounted on bushing 52 and carries a maximum speed pointer 56, a ratchet 57 and a spur gear 58.

It will be noted that the shaft 126 (Fig. 6) having spur gear portion 127, has, in this embodiment, an enlarged upper portion formed as a spur gear 59 in mesh with spur gear 58. The lower end of shaft 126 is square in cross section and adapted to receive a key 60 which is used for the purpose of returning the contact 116 and pointer 56 to the initial start position as will be described more clearly below.

A solenoid 61 is secured to an L-shaped bracket 62, which bracket 62 is mounted upon the jewel bracket 55 for limited rotary movement. More specifically, a screw 63 (Fig. 5), having a threaded portion secured to bracket 62 (Fig. 7), extends through jewel bracket 55 with a slight amount of clearance; screw 63 has a shoulder 64 below bracket 55 with a slight clearance therebetween. A pin 65 (Fig. 7) is pressed into a bore in bracket 62 and is received through an arcuate aperture 66 in jewel bracket 55 to provide the limits of rotary motion of the bracket 62 and magnet 61. A spring 67 (Fig. 5), secured to a projection 68 on bracket 55 and to pin 65, urges the magnet 61 in clockwise direction with respect to Fig. 5 to a position in which a solenoid pawl 70 and detent 69 engage the teeth of ratchet wheel 57.

Particular attention is directed to Figs. 5 and 7 for the purpose of describing in detail the components of the solenoid 61. Solenoid 61 has a cup-shaped case 71 in which is disposed a coil 72 on a spool 73. Case 71 is staked inwardly 74 to secure spool 73 in place. The core 75 extends into the case to a point midway between the ends of spool 73, said core 75 also being used for the purpose of securing solenoid 61 to the bracket 62. A plunger 76 is slideably carried by a washer 77 rigidly secured to the case 71. The plunger 76 carries an L-shaped bracket 80. Secured to bracket 80 is a pawl 70, which normally engages ratchet wheel 57. A spring 79, bearing against washer 77 and bracket 80, urges bracket 80, pawl 70 and therefore plunger 76 toward the right, with respect to Fig. 7, until collar 81 of plunger 76 engages washer 77. This is the normal position of plunger 76 with solenoid coil 72 de-energized.

The solenoid 61 is arranged for escapement type drive in which the coil 72 is energized to move plunger 76 and pawl 70 toward the left with respect to Figs. 5 and 7 to engage the next succeeding teeth counter-clockwise (Fig. 5) of ratchet wheel 57; when the solenoid coil 72 is de-energized, spring 79 urges pawl 70 toward the right, Fig. 5, to move ratchet wheel 57 one step clockwise. The detent 69, which is mounted on a projection 82 (Fig. 7) on bracket 62, holds the ratchet wheel 57 in place while pawl 70 is moved toward the left to engage another tooth upon energization of coil 72.

Due to limited available longitudinal travel of contact 116, the pointer 56 in the preferred embodiment travels through a shorter arc than speedometer pointer 105, and its corresponding scale must be similarly limited to the arc of pointer 56. To increase the arc of pointer 56 by additional gearing would only increase the cost and lead to complexity. By providing for contact 116 engaging contacting surface 115 only after a certain speed (e. g. 20 M. P. H.) has been attained, a more advantageous use of the limited movement of contact 116 is achieved.

The operation of the maximum speed indicating device will now be described. As the vehicle speed increases, disk 112 rotates in a clockwise direction with respect to Fig. 5. When contact 116 intermittently engages contacting surface 115, it intermittently completes a circuit (Fig. 10) for energizing the coil of solenoid 61. Solenoid 61 rotates the ratchet wheel 57 in clockwise direction with respect to Fig. 5. Spur gear 58 and maximum speed pointer 56 rotate with ratchet wheel 57, pointer 56 co-operating with the smaller centrally disposed scale on dial face 107 to indicate the maximum vehicle speed attained. The spur gear 58 rotates spur gear 59 of shaft 126 in a counterclockwise direction with respect to Fig. 5, spur gear 127 on shaft 126 moving contact 116 toward the axis of disk 112. As contact 116 is moved toward the axis of 112, it is apparent that disk 112 must be rotated further in a clockwise direction (as a result of a higher vehicle speed) before contact 116 can intermittently engage contacting surface 115 to further operate solenoid 61. In this manner, an accurate indication of the highest vehicle speed attained will be kept.

When it is desired to return the pointer 56 and contact 116 back to their initial start positions, key 60 (Fig. 6) is inserted upwardly over the lower end of shaft 126 (which is square) to engage a projection 83 on lever arm 84 which is pivoted on pin 85 secured to frame 111. The arm 84 is moved into engagement with pin 65 (Fig. 7) to rotate solenoid 61 in a counterclockwise direction with respect to Fig. 5. This causes pawl 70 and detent 69 to be moved out of engagement with ratchet wheel 57. Key 60 is then rotated clockwise with respect to Fig. 5, gear 127 cooperating with the rack portion of base 117 to move contact 116 away from the axis of disk 112 to its start position. Spur gear 59 rotates spur gear 58 (and ratchet wheel 57 and pointer 56) counter-clockwise with respect to Fig. 5 to the initial start position. A very simplified key arrangement has been shown although it is obvious that, when this maximum speed indicating arrangement is utilized by bus and truck companies to check speed of their drivers, any one of a number of modern, more complex lock arrangements may be utilized to prevent tampering. Also, if the maximum speed pointer 56 can be reset only with a special key (not in possession of the driver), this arrangement will provide in some cases somewhat reliable evidence that the driver had not exceeded a certain speed when arrested for a speed violation. At least it may set a maximum speed with which he may be charged by the violation.

The preferred embodiment of the invention has been shown in a mechanically driven magnetic speedometer because of the widespread use of said speedometer and because of its particular pertinence; however, it is to be understood that the invention is not to be limited thereby.

It is obvious that the reciprocating speed of contacts 16 and 116 can be increased by having more than 1 cam portion on the periphery of cross gears 8 and 108 respectively. It is also obvious that any conventional power means for imparting reciprocable motion to contact 116 can be used, for example electromagnetic or thermal.

While there has been described what is at present believed to be the preferred embodiment of the invention, it will be understood that various modifications may be made therein; and it is contemplated to cover in the appended claims all such modifications as fall within the true spirit and scope of the invention.

What is claimed is:

1. In combination with a speed responsive device, a first contact means positioned by said device in accordance with the instantaneous speed, a second contact means disposed for engagement with said first contact means in a position thereof corresponding to a predetermined speed, means for causing said engagement of said second contact means with said first contact means to be intermittent, and circuit means controlled by an engagement of said first and second contact means.

2. In combination with a speed responsive device, control apparatus comprising a first electrical conducting element moved by said speed responsive device to positions corresponding to the instantaneous speed controlling said device, a second electrical conducting element disposed for engagement with said first element in positions of said first element corresponding to a certain speed and all higher speeds, means for moving said second element into intermittent engagement with said first element in said last-mentioned positions of said first element, and circuit means controlled by the intermittent engagement of said elements.

3. In combination with a speed responsive device of the type in which a magnetic element is rotated within a metallic cup-shaped member to cause angular displacement of said member proportional to the speed of rotation of said element, a first contact means positioned by said device in accordance with the position of said member, a second contact means disposed for engagement with said first contact means in a certain position thereof, means for moving said second contact means into intermittent engagement with said first contact means in said certain position, and circuit means controlled by an engagement of said first and second contact means.

4. In combination with a vehicle speedometer of the type in which a speed-controlled drive element rotates a magnet within a cup-shaped metallic member to angularly displace said member in proportion to the instantaneous vehicle speed, a first contact means positioned by the speedometer in accordance with the instantaneous vehicle speed, a second contact means disposed for engagement with said first contact means in positions of said first contact means corresponding to a certain speed and all higher speeds, mechanical means including a cam actuated by the rotation of said drive element for moving said second contact means into intermittent engagement with said first contact means in said last mentioned positions of said first contact means, and circuit means controlled by an engagement of said first and second contact means.

5. For use with a speedometer of the type in which a magnet is rotated within a rotatably mounted metallic cup-like member to cause angular displacement of said member proportional to the speed of rotation of said magnet, control apparatus comprising a non-metallic disk mounted for rotation with said member, an electrical conducting material on a portion of one side of said disk, a contact disposed adjacent to the side of said disk and movable toward and away from said disk, means for moving said contact into intermittent engagement with said disk, said contact and said conducting material relatively disposed for electrical engagement in a predetermined position of said disk and circuit means controlled by the electrical engagement of said contact and said material.

6. The combination claimed in claim 5 wherein said magnet is rotated by a speed-controlled drive shaft and wherein said means for moving said contact into intermittent engagement with the disk comprises a rod connected to said contact and slidably mounted in a plane substantially perpendicular to said side of the disk, a cam means rotated by said drive shaft for moving said rod reciprocably in said plane and biasing means urging said shaft toward said cam means.

7. In combination with a vehicle speedometer of the type in which a speed-controlled drive element rotates a magnet within a cup-shaped metallic member to angularly displace said member in proportion to the instantaneous vehicle speed, control apparatus comprising a substantially flat non-metallic disk secured coaxially with said member for rotation therewith; a metallic surface on a portion of one side of said disk, the distance between the axis of said disk and the inner edge of said surface differing progressively along successive radial sections of the disk; a contact disposed in proximity to said one side of disk and manually movable to positions along a certain line extending radially through the axis of the disk; means for moving said contact into intermittent engagement with said one side of the disk, said contact and said surface effective for making intermittent electrical engagement in any one of a plurality of positions of the disk corresponding to a predetermined vehicle speed and in positions of the disk corresponding to speeds higher than the predetermined speed and circuit means controlled by an engagement of said contact and said surface.

8. The combination claimed in claim 7 wherein said means for moving said contact into intermittent engagement with the disk comprises a rod connected to said contact and reciprocably mounted in a plane substantially parallel to the axis of rotation of said disk, cam means rotated by said drive shaft and in operative engagement with said rod for imparting reciprocable motion to said rod and biasing means urging said rod toward said cam means.

9. For use with a speedometer of the type in which a magnet is rotated within a metallic cup-like member to cause angular displacement of said member proportional to the speed of rotation of said magnet, a speed warning device comprising a non-metallic disk mounted for rotation with said member, an electrical conducting material on said disk, a contact mounted in proximity to said disk and manually movable toward and away from said disk, means for moving said contact into intermittent engagement with said disk, said contact and said conducting material relatively disposed for electrical engagement in a predetermined position of said disk and means responsive to the engagement of said contact and said material for causing an alarm.

10. For use with a speedometer of the type in which a speed-controlled drive shaft rotates a magnet within a metallic cup-like member to cause angular displacement of said member proportional to the speed of rotation of said magnet, a speed warning device comprising a non-metallic disk secured coaxially with said member for rotation therewith; an electrical conducting material on one side of said disk having an inner edge describing substantially a helix with respect to the axis of the disk and extending from said inner edge generally to the periphery of said disk; said surface disposed on said disk for providing a progressively increasing width along a certain line extending radially from the said axis as vehicle speed increases; a contact disposed adjacent to said one side of the disk and movable to positions along said radial line; means for moving said contact into intermittent engagement with said disk; said contact and said material effective for making intermittent engagement in a desired one of a plurality of positions of said disk corresponding to predetermined speeds and in positions of said disk corresponding to speeds higher than that corresponding to said one desired position of the disk; and alarm means controlled by the engagement of said contact and said material.

11. The combination claimed in claim 10 wherein said means for moving the contact into intermittent engagement with the disk comprises a rod connected to said contact and reciprocably mounted in a plane parallel to the axis of said disk; a cam means rotated by said drive shaft and in engagement with said rod; and biasing means urging said rod toward said cam means.

12. For use with a vehicle speedometer of the type in which a member is angularly displaced in proportion to the instantaneous speed of the vehicle, a maximum speed indicator comprising a first electrical conducting element angularly displaced with said member and having a reference point moved to radial positions corresponding to the instantaneous vehicle speed; a second electrical conducting element disposed in proximity to said first element; and movable from a certain position to a plurality of other positions, in which certain and other positions said second element engages said first element in positions thereof corresponding to a predetermined vehicle speed and certain progressively higher speeds respectively; means for causing the engagement of said second element with said first element to be intermittent; a pointer and scale cooperating to indicate the maximum vehicle speed attained; and means responsive to the intermittent engagement of said first and second elements for moving said pointer to positions corresponding to the highest instantaneous speed attained and for moving said second element progressively into succeeding positions thereof in which said second element is engageable with said first element only at progressively higher speeds.

13. For use with a vehicle speedometer of the type in which a speed-controlled drive shaft rotates a magnet in proximity to a metallic member to cause angular displacement of said member in proportion to the instantaneous speed of the vehicle, a maximum speed indicator comprising a non-metallic disk angularly displaced with said member; a metallic conducting surface on said disk having its inner edge describing a helix with respect to the axis of said disk and extending from said inner edge generally toward the periphery of said disk, said surface disposed on said disk for providing a progressively increasing width along a certain line extending radially from axis of said disk as vehicle speed increases; a contact disposed adjacent to said surface and movable substantially parallel to the plane of said disk to positions along said radial line; means for moving said contact into intermittent engagement with said disk and the surface thereon; a pointer and scale cooperating to indicate the maximum vehicle speed attained; and means responsive to the intermittent engagement of said contact and said surface for moving said pointer to positions corresponding to the highest instantaneous speed attained and for moving said contact progressively to succeeding positions thereof closer to said disk axis in which succeeding positions said contact is engageable with said surface only at progressively higher speeds.

14. The combination claimed in claim 13 in which said means for moving said contact into intermittent engagement with said surface comprises a rod connected to said contact and reciprocably mounted in a plane substantially parallel to the axis of said disk, a cam means rotated by said drive shaft and in engagement with said rod, and biasing means urging said rod toward said cam means.

15. The combination claimed in claim 13 in which said last mentioned means comprises gear means operatively connected to said contact and said pointer and solenoid means for actuating said gear means, together with manually operated means for actuating said gear means to restore said contact and pointer to their initial positions.

16. In combination with a unitary, integrally-connected vehicle speedometer and odometer structure of the type in which a speed-controlled drive shaft rotates a magnetic element within a metallic cup-shaped member to cause angular displacement of said member proportional to the speed of rotation of said element and rotates a gear train to actuate the odometer, a control device comprising a first contact means moved by said member to positions corresponding to instantaneous vehicle speed, a second contact means disposed for engagement with said first contact means in a certain one of said positions, mechanical means integral with said second contact means and said gear train for moving said second contact means into intermittent contact with said first contact means in said certain position, and circuit means controlled by the engagement of said first and second contact means.

17. The combination claimed in claim 16 wherein said mechanical means comprises a rod connected to said second contact means and slidably mounted in a plane substantially perpendicular to the plane in which said first contact means is variably positioned, a cam means included in said gear train in engagement with said rod for reciprocably moving the rod in said first mentioned plane, and biasing means urging said rod toward said cam means.

18. The combination claimed in claim 17 wherein said one of said contact means has a surface area extending in the direction of movement of said first contact means for causing engagement of said first and second contact means in said certain position and in all positions of said first contact means corresponding to speeds higher than the speed corresponding to said certain position.

19. In combination with a unitary, integrally-connected vehicle speedometer and odometer structure of the type in which a speed-controlled drive means rotates a magnet within a metallic member to angularly displace said member in proportion to the instantaneous vehicle speed and rotates a gear train to actuate the odometer, a speed warning device comprising a first contact means angularly displaced with said member, a second contact means disposed for engagement with said first contact means when said first contact means has been angularly displaced at least to a predetermined radial position, mechanical means controlled by said gear train for causing the engagement of said second contact means with said first contact means to be intermittent, and circuit means controlled by an engagement of said first and second contact means for causing an alarm.

20. In combination with a speed responsive device; a first contact means having a reference point moved by said device to positions corresponding to differing instantaneous speeds; a second contact means disposed adjacent to said reference point in one of said positions corresponding to a predetermined speed, said first contact means having an electrical conducting surface on one side of said reference point for disposition in said one position at said predetermined speed and at all speeds progressively differing in a predetermined arithmetic manner from said predetermined speed; means for moving said second contact means into intermittent engagement with said conducting surface in said one position; and circuit means controlled by the intermittent engagement or non-engagement of said second contact means and the conducting surface.

References Cited in the file of this patent

UNITED STATES PATENTS

| | | |
|---|---|---|
| 1,305,649 | Freytag | June 3, 1919 |
| 1,959,634 | Nickle | May 22, 1934 |
| 2,030,246 | Davis | Feb. 11, 1936 |
| 2,159,341 | Paul | May 23, 1939 |